United States Patent
Amaro et al.

(10) Patent No.: US 6,222,745 B1
(45) Date of Patent: Apr. 24, 2001

(54) DIGITALLY SYNTHESIZED MULTIPLE PHASE PULSE WIDTH MODULATION

(75) Inventors: Michael G. Amaro; Joseph G. Renauer, both of Naperville, IL (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/421,461

(22) Filed: Oct. 19, 1999

(51) Int. Cl.$^7$ ............................... H02M 7/00; G05F 1/40
(52) U.S. Cl. ....................... 363/65; 363/71; 323/285
(58) Field of Search .................. 363/65, 25, 26, 363/98, 71; 323/282, 283, 285

(56) References Cited

U.S. PATENT DOCUMENTS

| | | | |
|---|---|---|---|
| 5,272,614 | * 12/1993 | Brunk et al. | 363/21 |
| 5,590,033 | * 12/1996 | Kawano | 363/25 |
| 5,973,485 | * 10/1999 | Kates et al. | 323/272 |
| 6,058,030 | * 5/2000 | Hawkes et al. | 363/65 |

* cited by examiner

*Primary Examiner*—Rajnikant D Patel
(74) *Attorney, Agent, or Firm*—W. Daniel Swayze, Jr.; Wade James Brady, III; Frederick J. Telecky, Jr.

(57) ABSTRACT

A DC to DC converter includes multiple stages to share power handling. The stages are connected in parallel paths between the source input and the load output of the power converter. An analog error signal is generated by comparing the load output signal to a reference signal. The error signal is fed to a phase shifting input of a phase lock loop. The phase lock loop is connected to receive a reference clock signal and maintain a relative clock signal shifted in phase from the reference clock signal by an amount depending on the error signal. Digital divider circuits and digital logic circuits are used to produce phase shifted variable pulse width control signals for the stages. The parallel connected power conversion stages equally share the transfer of power from the input source to an output load. A single analog to digital conversion of a single analog error signal to multiple, phase shifted, variable duty cycle clocks is provided.

13 Claims, 8 Drawing Sheets

PHASE D= 1260° WITH RESPECT TO MASTER REFERENCE CLOCK MASTER RELATIVE CLOCK
PHASE D= 315° WITH RESPECT TO REFPHASE$_N$ CLOCK AND RELPHASE$_N$ CLOCK
PHASE D= 210° WITH RESPECT TO REFCLOCK AND RELCLOCK

DIGITALLY SYNTHESIZED MULTIPLE PHASE PULSE WIDTH MODULATION

BACKGROUND OF THE INVENTION

1. Field of the Invention

The present invention relates generally to a power converter and in particular to a DC to DC power converter which uses variation in pulse width, also referred to as variable duty cycle, to an control output voltage.

2. Description of the Related Art

DC to DC power conversion is used to provide a regulated DC output voltage of a lower value to a load from an unregulated higher input voltage as a source. In most applications, the input is a voltage source and the output of the DC to DC converter is precisely controlled to maintain a predetermined voltage regardless of variations in the load current; in other words, the load current is an independent variable. An example of an application of DC to DC power conversion is in a personal computer, wherein the power supply for the computer has a 12 volt DC output for powering all internal components of the computer. The power demands vary depending on the components drawing power at the time. The processor for the computer requires a lower operating voltage, for example, 3.3 volts DC, which must be derived from the 12 volt supply. The proper operation of the processor demands that the voltage supplied to the processor be tightly controlled, regardless of variations in the 12 volt signal. An example of such an application is shown in FIG. 1, wherein a computer 20 has a power supply PS, also referenced 22, that is either a battery or an AC to DC converter from line power. A DC to DC power converter 24 receives the output of the power supply PS, reduces it to a controlled DC level of, for example, 3.3 volts and supplies it to a microprocessor chip 26. New technology is being introduced which requires voltages lower than 3.3 volts, such as a 1.2 volt supply instead of a 3.3 volt supply to the microprocessor 26. This is generated from the 12 volt power supply 22, which represents a ten fold drop in the voltage from the source to the load of the power converter 24 and presents an even greater difficulty of accurate control of the voltage to the load that the 3.3 volt load.

The power converter 24 may be visualized as composed of two functional parts, namely a power conversion stage 28 and a controller stage 30, as shown in FIG. 2. The power conversion stage 28 receives the input or source voltage $V_{in}$ to the power converter 24, such as from the power supply 22 of FIG. 1 and supplies the regulated output voltage $V_{out}$ to the load, such as to the microprocessor 26. The controller 30 monitors the output of the power conversion stage 28 by a connection 33 and compares it to a reference voltage $V_{ref}$ received at a reference input 32 and sends a control signal over a control lead 34 to the power conversion stage 28 to adjust the voltage of the output, if necessary.

A variety of methods of control have been utilized for power conversion in controlled voltage applications. One such approach is pulse width modulation. Pulse width modulation is utilized in DC to DC power converters for efficiently transferring power from the input source to an output load, i.e. without draining off the excess as heat using a dissipative element, for example. A conventional approach to pulse width modulation is to use an integrating amplifier, for example, as the controller 30, to generate an error signal based on a difference between the desired output voltage $V_{out}$ and a predetermined reference voltage $V_{ref}$. An analog-to-digital (A-to-D) conversion is performed by comparing the analog error signal from the integrating amplifier to an analog sawtooth signal or triangular-shaped waveform signal using an analog comparator to convert the analog error signal to a digital clock signal. The A-to-D conversion produces a variable duty cycle clock signal that is proportional to the analog error signal. The variable duty cycle clock signal is used within a DC-to-DC converter circuit, such as the power conversion stage 28, to selectively control the transfer of power from the input source to the output load to achieve the desired output voltage. In other words, the power conversion stage 28 turns on for the duration of the pulse and off at the end of the pulse. The output is averaged to achieve the output voltage $V_{out}$. The variable duty cycle control signal changes the proportion of the time that the power converter stage 28 is on. Thus, pulse width modulation architectures require the use of an analog sawtooth or a triangular-shaped waveform for converting the analog error signal to a variable duty cycle digital clock signal.

The need for innovation beyond the afore-described power conversion architecture is recognized when more power is required than can be handled by a single power conversion stage. In particular, the power transfer from the input source 22 to the output load 26 exceeds the allowable capacity or the practical size of a single power conversion stage 28. Delivery of more power is accomplished by providing multiple power conversion stages 36, as illustrated in FIG. 3, each supplying a portion of the total output power. Each stage 36 is of like kind and quality. In a DC-to-DC converter, the power conversion stages are comprised of transistors, inductors and/or transformers, capacitors, and diodes which are assembled for transferring power at a predetermined frequency. Each of the stages 36 in a multiple stage power supply has the same components which are matched to the limits of their parasitic characteristics and connected in the same circuit configuration.

In FIG. 3, each power conversion stage 36 is controlled by the variable duty cycle clock signal 34 to control the transfer of power from its input to its output. While each stage 36 would carry a portion of the load, any mismatch in characteristics results in an imbalance of the power from the respective stages. Further, by controlling all stages 36 from a single clock signal 34, all of the stages 36 turn on and turn off simultaneously. This creates undesirable large transient load conditions for the source.

Another requirement for multiple stages occurs when a need for increasing the effective power transfer frequency of the DC-to-DC converter is seen. Each of the stages operates at a predetermined frequency. Providing multiple stages operating shifted in time increases the power transfer frequency without costly high frequency power conversion stages. Operating the stages shifted in time also avoids the simultaneous turn on and turn off of the stages, thereby placing less strain on the source. Such multiple stages 36 require multiple, variable duty cycle clock signals, matched in duty cycle and frequency yet shifted in time and generated from a single analog error signal, to drive them. In particular, since all of the power conversion stages 36 are connected in parallel and are of like kind and quality, it is required that each clock signal operate at the same frequency and the same duty cycle to provide a balance in the power handled by the individual stages 36.

FIG. 4 illustrates a power converter construction which is capable of such multiphase time shifted operation. Instead of the single control signal 34 to the stages 36 as in FIG. 3, the converter 40 of FIG. 4 produces separate control signals 38 for each of the stages 36. Phase shifting the control signals 38 to the stages 36, in other words, spacing the variable duty cycle clock signals from one another in time such that no two clock signals are coincident in time avoids the simultaneous turn on and turn off of the stages 36 and achieves an effectively higher power transfer frequency. For example, two power conversion stages 36 controlled by two coincident, 500 kHz variable duty cycle digital clock signals 34 (as in FIG. 3) results in the transfer of power at a 500 kHz rate. However, two power conversion stages 36, each controlled by a variable duty cycle 500 kHz digital clock signal 38 spaced at a 180° phase relation to each other results in the transfer of power at a 1000 kHz rate. The concept can be extended to N power conversion stages 36, each controlled by a variable duty cycle clock of frequency F spaced evenly at a 360°/N phase relation which results in the transfer of power at a rate of F multiplied by N. In FIG. 4, N is equal to 4, and the controller 40 produces four separate clock signal outputs.

FIG. 5a shows a controller 40 of the type which could be used in the circuit configuration of FIG. 4, and FIG. 5b shows the signals for the stages of the circuit of FIG. 5a. The output signal $V_{out}$ and the reference signal $V_{ref}$ are supplied as inputs to an integrating error amplifier 42. The resulting error signal $V_{error}$ is supplied to N comparators 44, here four comparators, where the error signal is compared to multiple, phase shifted, analog sawtooth waveforms $V_{sw1}$ to $V_{sw4}$ which results in the conversion of the analog error signal $V_{error}$ to multiple, variable duty cycle, digital clocks signals $38_1$ to $38_4$. The comparators 44 which with the sawtooth waveforms are analog to digital conversion blocks are required to be matched. This analog approach introduces many undesirable effects, which ultimately results in unequal power transfer between power conversion stages as a result of mismatches in duty cycle and frequency between phases. These undesirable effects are a result of the difficulty involved in matching the frequency, amplitude and phase performance of the N number of analog to digital conversion blocks 44 required by this architecture. Calibration circuitry and or additional feedback paths must be added to the modulation architecture to overcome inherit mismatches in each analog to digital conversion block such that the same error voltage results in each variable duty cycle clock to be matched in frequency and duty cycle. This added circuitry increases the complexity, size and cost of the power convertor circuit.

SUMMARY OF THE INVENTION

The present invention uses simple digital design methodologies to implement pulse width modulation architectures requiring multiple phase, parallel connected, power conversion stages to equally share the transfer of power from an input source to an output load. A single analog to digital conversion and digital circuitry replace the multiple analog to digital conversions described in the foregoing pulse width modulators as the means of converting a single analog error signal to multiple, phase shifted, variable duty cycle clocks. The present digital implementation and architecture is capable of meeting the critical architectural requirement of matched duty cycles and switching frequencies across all phases with reduced complexity while retaining excellent transient performance.

The invention described here produces a pulse width modulation architecture featuring multiple, phase shifted, variable duty cycle clock signals to implement a DC to DC converter having multiple phase, parallel connected, power conversion stages. This architecture reduces the complexity, size, and cost of the power converter by implementing the critical requirements of duty cycle matching, frequency matching and phase shifting using a single analog to digital conversion block and digital logic circuitry.

The function of the analog to digital conversion block remains fixed regardless of the pulse width modulation architecture, that is, to convert the analog error signal to a clock signal whose duty cycle is proportional to an error signal at a switching frequency set by a master reference clock signal. In contrast to prior architectures, where a separate analog to digital conversion block is required for each phase of the DC to DC converter topology, the present invention provides for the use of a modified phase lock loop circuit as the only analog to digital conversion block. The addition of digital circuitry permits a single analog error signal to precisely control the duty cycle and frequency of multiple, phase shifted, digitally generated clock signals.

The phase lock loop circuit performs a frequency matching of two 50% duty cycle clock signals, matching a master relative clock signal to a master reference clock signal, while establishing a phase shift between the two clock signals that is proportional to an analog error signal. The master reference clock signal and master relative clock signals are divided by digital divider circuits to produce reference clock signals and relative clock signals that are matched in frequency and variable in phase. Digital circuits are utilized to produce the phase shifted, variable duty cycle clock signals corresponding in number to the number of stages. These variable duty cycle clock signals are used to control the stages of a multiple stage power conversion circuit.

Through the use of digital circuitry, frequency matching and duty cycle matching is achieved for any number of phases or stages of the power converter, without requiring added feedback loops or complex calibration. An added benefit is fast transient response which provides a quick change in the duty cycle of the clock signals when a phase change occurs between the master reference clock signal and the master relative clock signal.

An alternative to the use of the phase lock loop circuitry is also provided, wherein a digital signal processor is utilized for the phase determination.

BRIEF DESCRIPTION OF THE DRAWINGS

FIG. 5b is a series of signal diagrams showing the signals for the circuit of FIG. 5a;

DETAILED DESCRIPTION OF THE PREFERRED EMBODIMENTS

Figure 1:
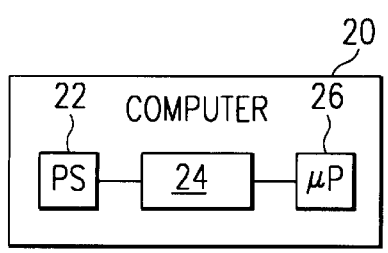
FIG. 1 is a simple block diagram of a DC to DC power conversion arrangement in a typical application.
Figure 2:
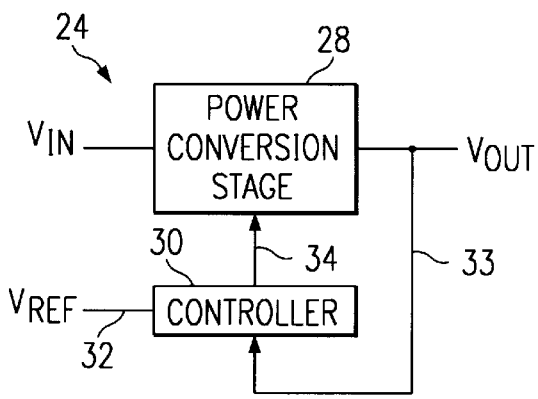
FIG. 2 is a functional block diagram showing the power conversion portion of FIG. 1.
Figure 3:
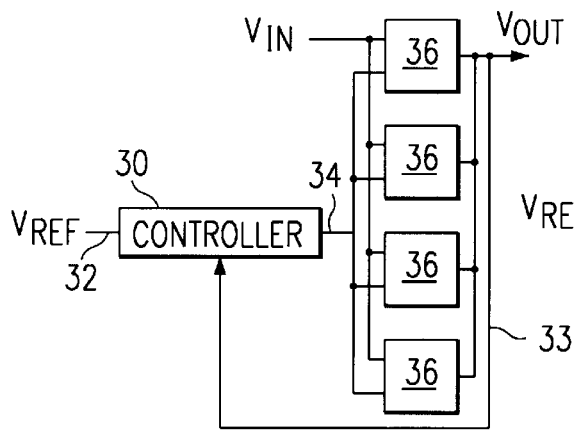
FIG. 3 is a functional block diagram of a parallel path power conversion architecture with a common control of the conversion stages.
Figure 4:
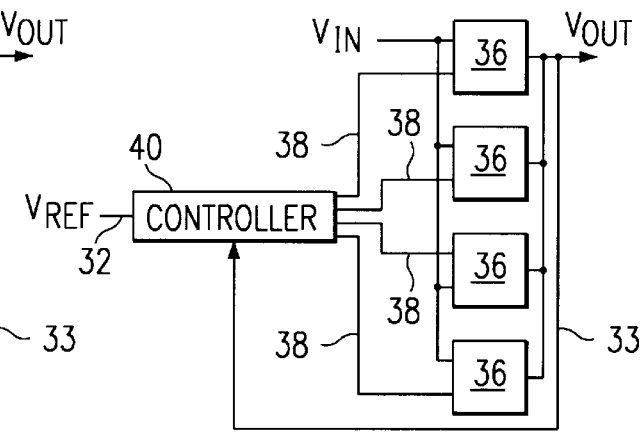
FIG. 4 is a functional block diagram of a parallel path power conversion architecture with individual control of the conversion stages.
Figure 6:
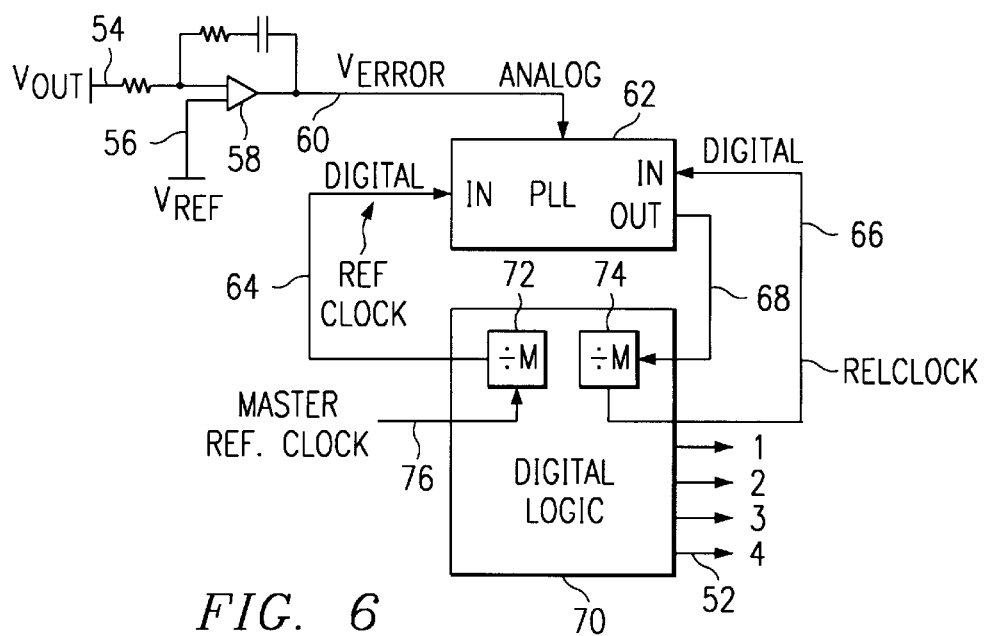
FIG. 6 is a block diagram of the controller for the parallel path power conversion architecture according to the invention.
Figure 5A:
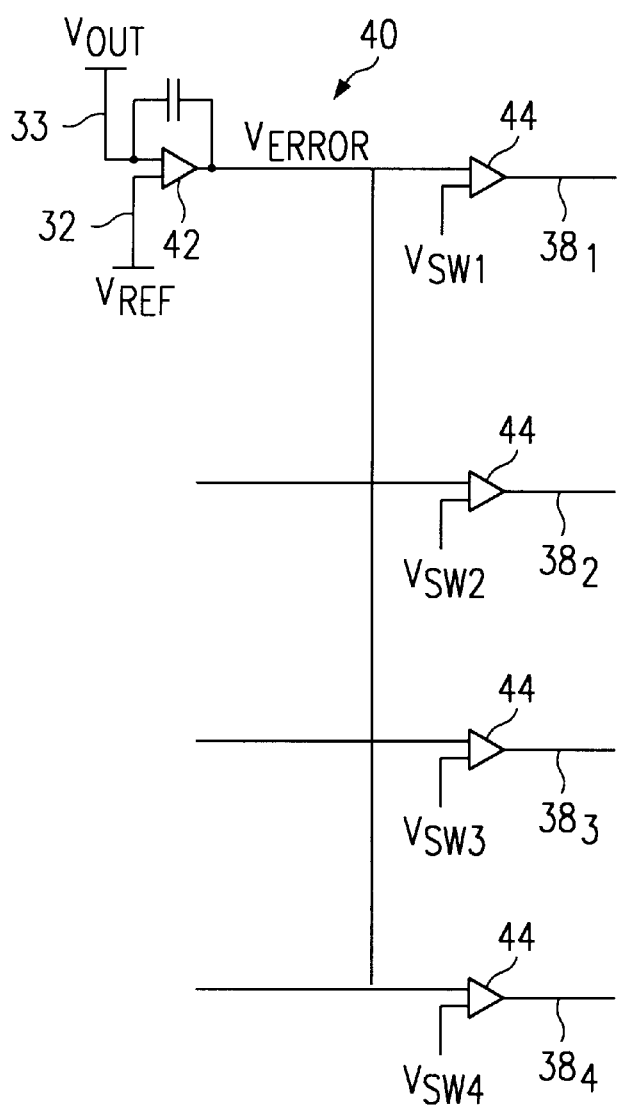
FIG. 5a is a functional element diagram showing the controller for the parallel power converter of FIG. 4
Figure 5B:
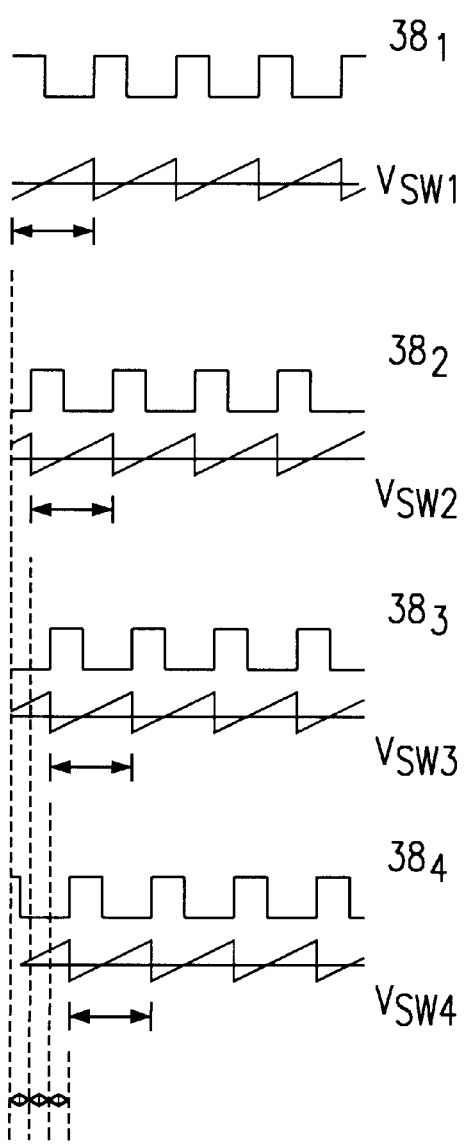

Referring to FIG. 6, a controller 50 for a power converter for DC-to-DC conversion is provided. The controller 50 is connected to supply variable duty cycle clock signals to a group of parallel connected power conversion stages connected between a source and a load similar to the power conversion stages 36 shown in FIG. 4. A single controller 50 is provided for the stages, wherein each stage is connected to a separate control output 52 of the controller 50. Here, the control outputs 52 are numbered 1, 2, 3 and 4 for a four stage, or four phase power converter, although other numbers of stages may be used as needed. Four stages are shown here only for purposes of illustration.

Each power conversion stage, such as the power conversion stages 36, may be a single power conversion stage or may themselves be multiple power conversion stages running from the same control signal. For example, the power conversion stages 36 in FIG. 4 when used in the present invention may each be four stages themselves so that 16 stages would be provided. Other numbers of stages may of course be provided as well.

As in the previously described converters, the output voltage $V_{out}$ at lead 54 and reference voltage $V_{ref}$ at lead 56 are provided to an integrating error amplifier 58 to produce an analog error signal $V_{error}$ at lead 60. The reference voltage $V_{ref}$ can either be fixed or can be varied or made digitally programmable, for example, to provide a further controllable input for the user. This analog signal is fed into a phase lock loop circuit 62, although as indicated above, a digital signal processor is also contemplated for this element. In a preferred embodiment, the phase lock loop part number 74HC4046 is used, which is a circuit that permits access to input an offset signal, which here is the error signal as the offset. The phase lock loop 62 also receives the reference clock signal at lead 64 and the relative clock signal at lead 66 and produces an output on lead 68.

A digital logic block 70 is provided from which the phase shifted clock signals 52 are output. The digital logic block 70 has two divided by M digital dividers 72 and 74 labeled ÷M within the controller. The divider 72 receives a master reference clock signal at lead 76 and outputs the divided signal as the reference clock signal on lead 64. The divider 74 receives the output of the phase lock loop 62, which is the master relative clock signal, on lead 68 and produces the relative clock signal on lead 66 by dividing by M. The two divide by M circuits are identical digital circuits that divide the master reference clock by M and the master relative clock by M resulting in Refclock and Relclock signals, respectively. Their presence is critical to the architecture and their implementations are performed digitally to minimize complexity and ensure critical matching. The value required for M is a function of the number of phases to be established for the application. This number must be larger than the number phases but is minimized to maximize the bandwidth of the phase lock loop 62. A practical rule is the number of phases plus 2. Therefore, in an N phase system, an acceptable value for M is N+2 meaning there are N+2 master reference clock cycles per Refclock cycle and N+2 master relative clock cycles per Relclock cycle. The duty cycles of Refclock and Relclock must be matched and is made equal to N divided by M. It is the phase relation between Refclock and Relclock that is controlled by the modified phase lock loop 62. The modification is that the analog error signal is input to the phase lock loop 62 to cause a phase difference proportionate to the error signal.

Figure 8:
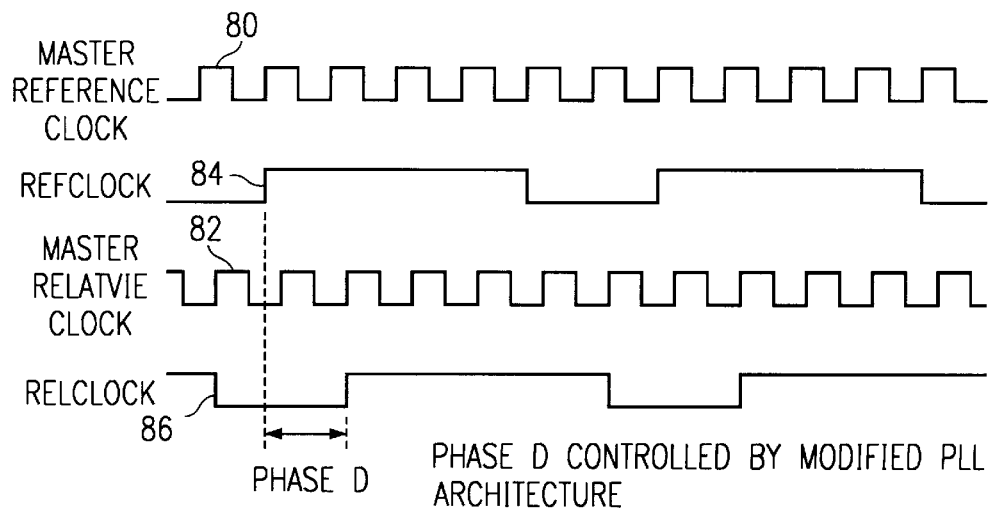
FIG. 8 is a signal diagram of signals illustrating the control of the phase difference by the phase lock loop circuit for a four phase system.

FIG. 8 shows the waveforms consistent with a 4 phase application, including a master reference clock signal 80, a master relative clock signal 82 produced by controlling the phase difference D using the error signal fed into the phase lock loop 62, the reference clock signal 84 generated by dividing the master reference clock signal 80 by 6, and the relative clock signal 86 generated by dividing the master relative clock signal by 6.

Figure 7:
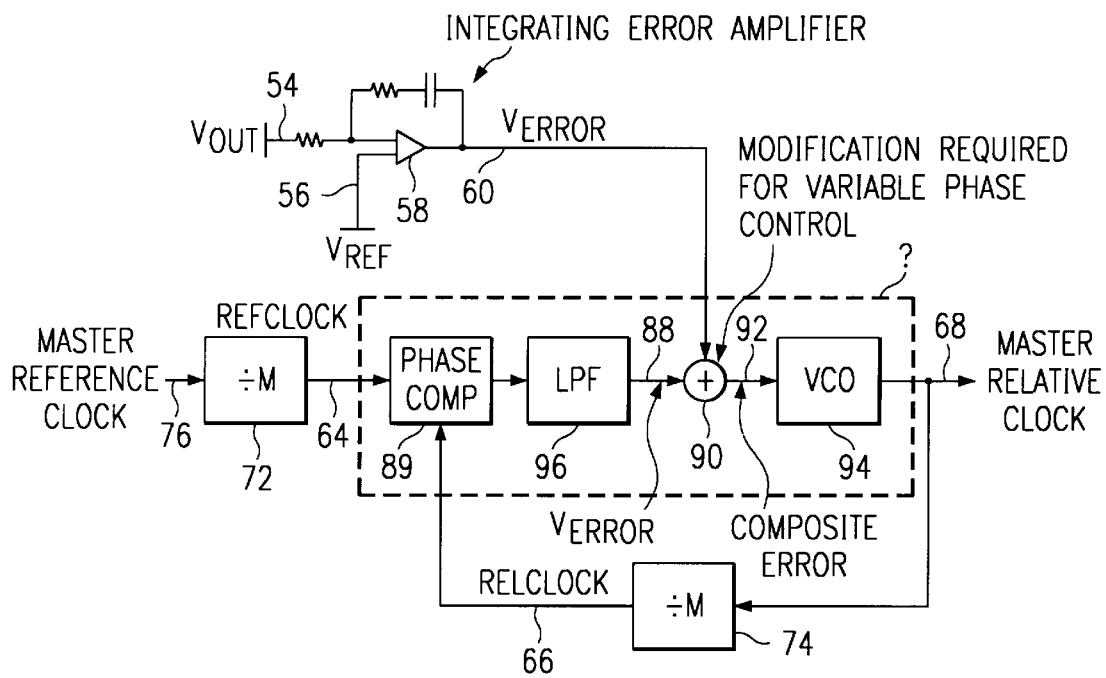
FIG. 7 is a functional block diagram showing the operating elements of the controller of FIG. 6 in more detail.

Turning to FIG. 7 where the circuit of FIG. 6 is shown in further detail, two analog error signals, a local error signal at lead 88 generated by a phase comparator 89 which is a component of the phase lock loop (PLL) architecture 62 and a system error signal on lead 60 generated by the integrating error amplifier are summed together in an adder 90 to create a composite analog error signal at lead 92. The composite analog error signal on lead 92 drives a voltage controlled oscillator (VCO) 94 to establish an output clock (a master relative clock) that is matched in frequency to an input clock (the master reference clock). In FIG. 7, the input clock is labeled Refclock and the output clock is labeled Relclock. To understand the operation of this modified phase lock loop 62, first consider the case when the DC to DC converter contributes no error signal on lead 60, therefore, the composite error signal on lead 92 is simply the local error signal of the phase lock loop 62. The phase comparator 89 error signal provides local negative feedback to force the voltage controlled oscillator 94 to produce an output clock that is frequency matched to the input clock. The phase comparator 89 error signal is generated by a phase comparison between the incoming clock, Refclock, and the synthesized clock, Relclock. The phase comparison can be as simple as an exclusive-or operation or something more complex. Regardless of the type of phase comparison performed, the signal that results is a clock signal whose duty cycle is analogous to the phase and frequency difference of the two signals. Averaging of the resulting clock signal using a low pass filter (LPF) block 96 of the phase lock loop architecture produces an average difference and is referred to as the PLL $V_{error}$ signal 88. A constant average value for the PLL $V_{error}$ signal implies there is no frequency difference between the two signals, just a phase difference. An average signal value that is varying implies both a frequency and phase difference.

Variation in the PLL $V_{error}$ signal continuously acts as local, negative feedback in the phase lock loop architecture to alter the voltage controlled oscillator 94 frequency until only a phase difference is established. The phase lock loop 62 is considered locked when there is no frequency difference, just a phase difference between the two signals. Since the voltage controlled oscillator 94 provides a continuously variable frequency output as a function of its input, there can be only one PLL $V_{error}$ signal value that will establish the lock condition. In the modified phase lock loop 62 architecture, there is only one composite error signal value that produces the lock condition. Summing the DC to DC converter error signal with the PLL error signal acts to change the composite error signal value. As already stated, there is only one composite error signal value that produces the lock condition, therefore, negative feedback will force the PLL error signal to change in order to maintain the composite error signal value required for the lock condition. A change in the PLL $V_{error}$ signal value is representative as a phase change between Refclock and Relclock. In summary, the modified phase lock loop 62 architecture enables the phase relationship between the incoming signal and the synthesized signal to vary as a function of an independent error signal while maintaining the frequency lock condition. In the present invention, the incoming signal is Refclock, the synthesized signal is Relclock, and the independent error signal is the DC to DC converter error signal. This innovative application and modification of a phase lock loop topology is critical to the architecture of the invention.

In the proposed implementation of this modified phase lock loop architecture, two clocks are defined, Refclock and Relclock, that are matched in frequency and variable in phase. Their phase relationship varies between 0° and 360° as a function of the analog error signal generated by the DC to DC converter for output voltage regulation. As a result of the matched divide by M stages, the master reference and master relative clocks are also matched in frequency and can vary in phase between 0° and M multiplied by 360°. The phase relationships of the two master clocks and between Refclock and Relclock are exploited by the digital circuitry to generate N phase shifted, variable duty cycle clocks.

The digital architecture disclosed here offers unsurpassed frequency matching and duty cycle matching across any number of multiple, phase shifted, variable duty cycle clocks over the known devices. This digital method eliminates the need for additional feedback or to perform complex calibration required by architectures deploying multiple analog to digital conversion blocks. The design of the digital circuitry preserves fast transient capability by ensuring the duty cycle of each phase shifted clock responds quickly to phase changes between the master reference clock and master relative clock.

Synthesis of a variable duty cycle clock involves dividing both the master reference clock and the master relative clock by N and then combining these resulting clocks with an exclusive-or operation. N clocks are generated at a frequency equal to the master clock frequency divided by N. In a 4 phase system, 4 clocks are generated at a frequency equal to the master clock frequency divided by 4. For the N clocks generated from the master clock, the division is synchronized to a different edge of the master clock such that the first N edges are used.

Figure 9:
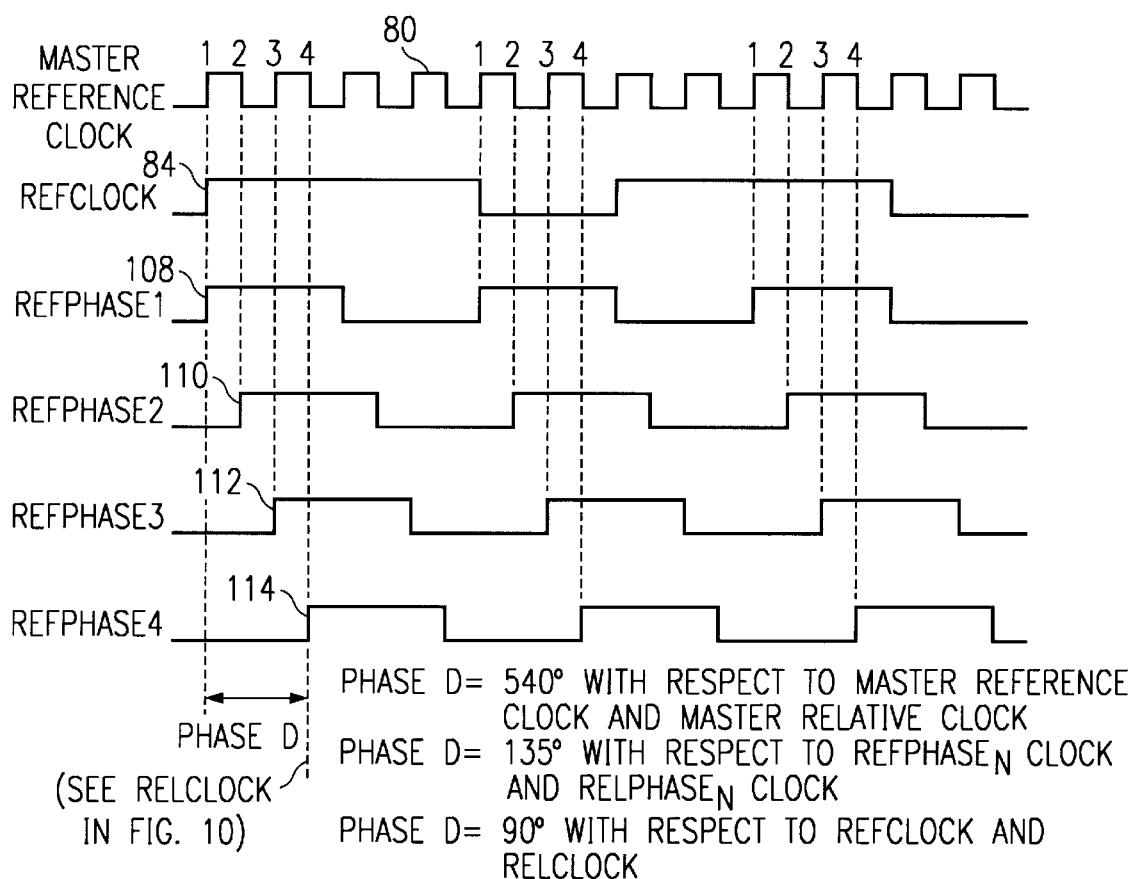
FIG. 9 is a signal diagram showing the reference clock signals.
Figure 10:
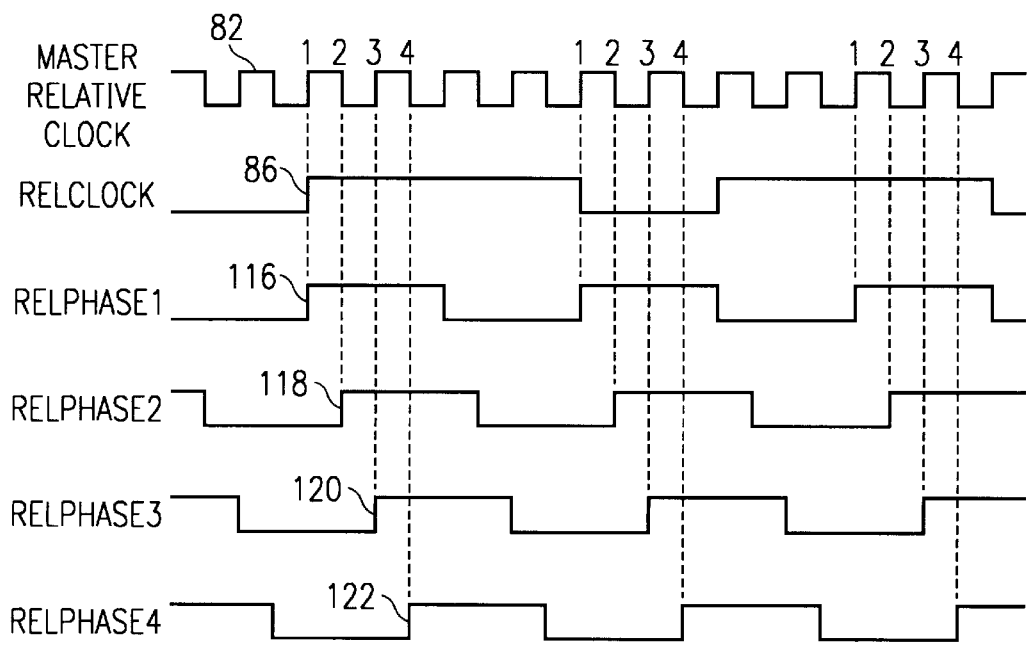
FIG. 10 is a signal diagram showing the relative clock signals, which when reviewed in conjunction with FIG. 9, show a 540° phase difference between the master reference clock and master relative clock signal.
Figure 11:
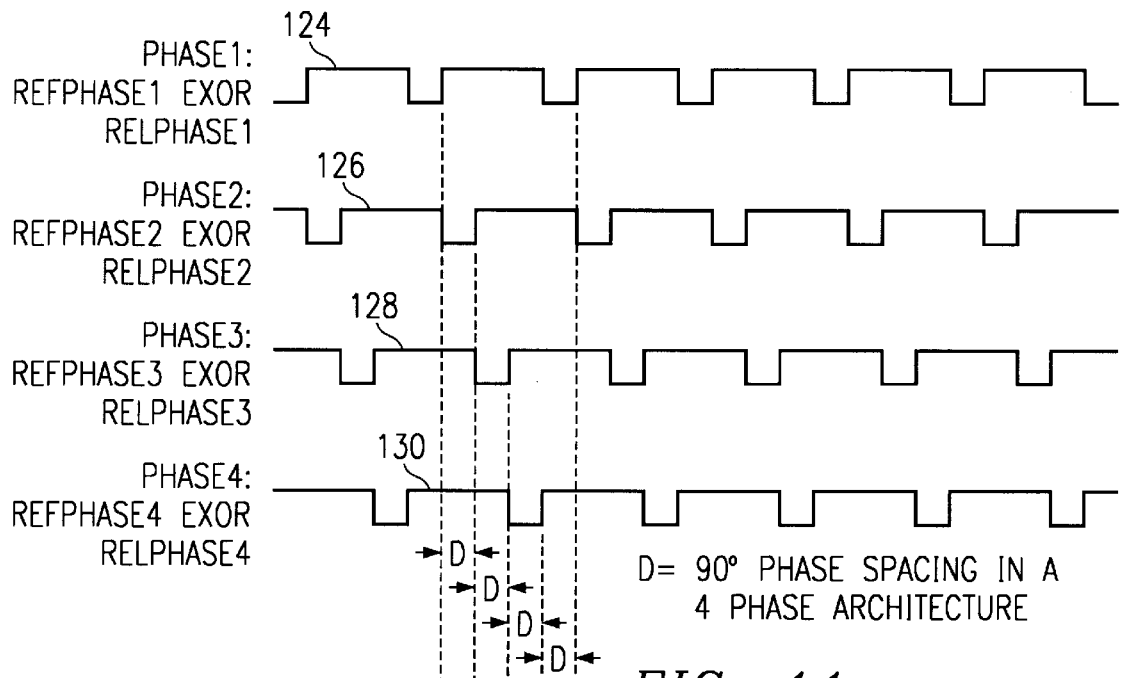
FIG. 11 is a signal diagram showing the composite clock signals that are output as the result of logic operations on the reference clock signals of FIG. 9 and relative clock signals of FIG. 10 for each phase.

FIGS. 9, 10 and 11 show the waveforms generated for a system with N equal to 4. The signal graphs of FIGS. 9, 10 and 11 should be considered together for a fuller understanding of the invention. The master reference clock 80 (FIG. 9) and master relative clock 82 (FIG. 10) are assumed to have a phase difference of 540° while the Refclock 84 and Relclock 86 signals have a phase difference of only 90° due the value of M in the modified Phase lock loop 62 architecture being assigned a value of 6. Four clock signals are digitally synthesized, using 4 divide by 4 blocks, from both the master reference clock and the master relative clock, referred to as Refphase$_n$ 108, 110, 112 and 114 and as Relphase$_n$ 116, 118, 120 and 122, respectively. The clock signals 108 to 122 are each subscripted with a number between 1 and N, 4 in this case, to associate them with the edge of their master clock to which the division has been synchronized. After the division by 4, the phase difference of 540° between the master clocks has been reduced to 135° between the Refphase and Relphase clock signals of the same subscript. Combining clocks with the same subscript using an exclusive-or operation results in four composite clocks, referred to as Phase$_n$ 124, 126, 128 and 130 (see FIG. 11), each doubled in frequency and with a duty cycle ratio equal to their phase difference, in degrees, divided by 180° and multiplied by 100% to express the result as a percentage. In this example, a phase difference of 135° has been established between each Refphase$_n$ and Relphase$_n$ resulting in a corresponding duty cycle ratio of 75% for each Phase$_n$ clock signal. The spacing of each Phase$_n$ clock signal was established by the divide by N synchronization operation to be 360° divided by N, or 90° in this example.

As mentioned earlier, the divide by M block of the Phase lock loop 62 architecture must be greater than N. This requirement simplifies control of the Phase lock loop 62 circuit by avoiding out of lock conditions. As noted in FIG. 9, a phase error of 135° between Refphase$_n$ and Relphase$_n$ clocks was achieved with only a 90° phase difference between Refclock and Relclock. A phase difference of 180° between Refphase$_n$ and Relphase$_n$ clocks results in a 100% duty clock phase clock after the exclusive-or operation with a phase difference of only 120° between Refclock and Relclock. A 0° phase difference between Refclock and Relclock results in a 0° phase difference between Refphase$_n$ and Relphase$_n$ clocks and therefore, a 0% duty cycle. The problem with this operating point is that a 0° phase difference between Refclock and Relclock may result in the Phase lock loop 62 circuit losing the lock condition. For this reason, a phase offset is added into the system, since, a phase difference between Refclock and Relclock ranging between 0° and 120° is all that is required to achieve a 0% to 100% duty cycle range on each phase clock. Therefore, 240° of phase difference between Refclock and Relclock remains unused before the Phase lock loop 62 would lose lock. Splitting this 240° by two allows the implementation of the Phase lock loop 62 block to establish a usable lock range for Refclock and Relclock between 120° and 240°, and thus, easily avoiding out of lock conditions that may result from Refclock and Relclock being at 0° or 360°.

Figure 12:
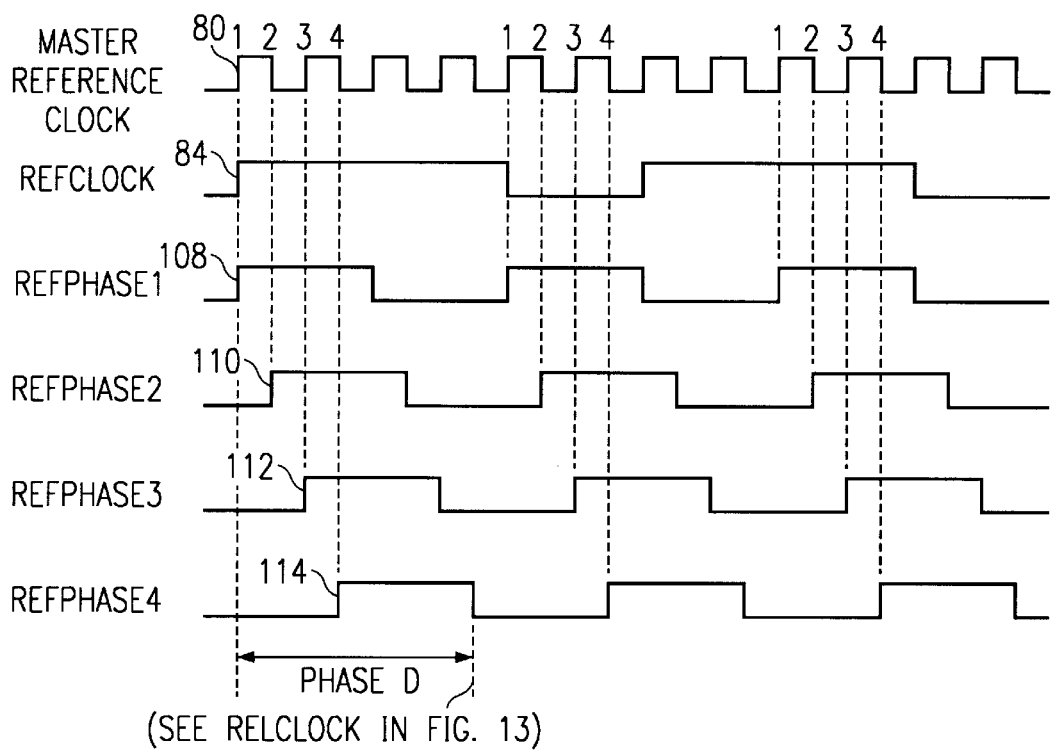
FIG. 12 is a signal diagram of showing the reference clock signals.
Figure 13:
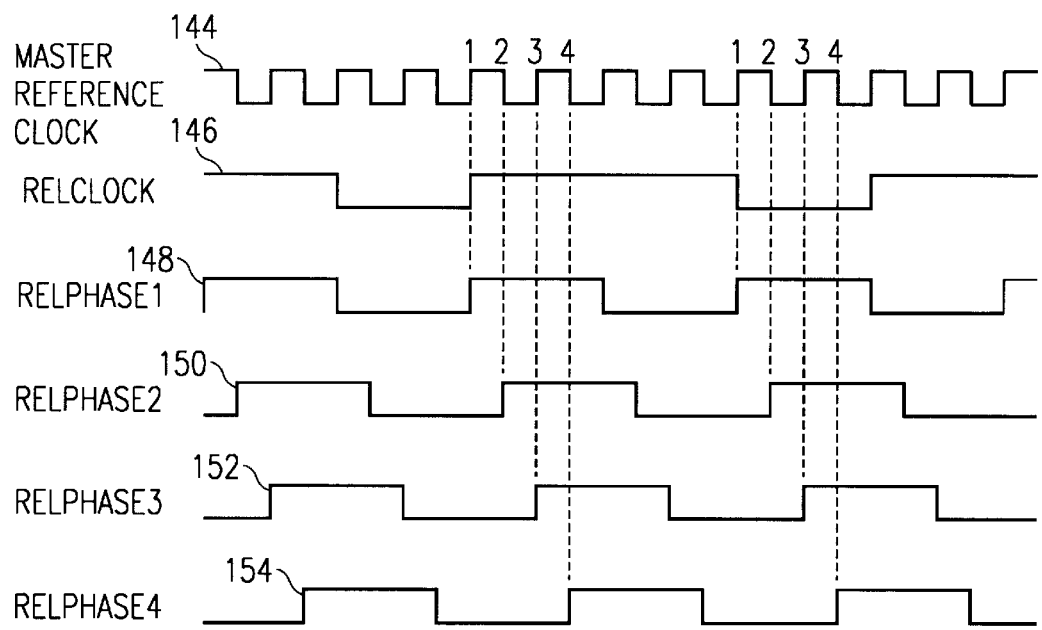
FIG. 13 is a signal diagram of showing the relative clock signals for review in conjunction with FIG. 12 and with an added 120° phase difference added as compared to FIG. 9.
Figure 14:
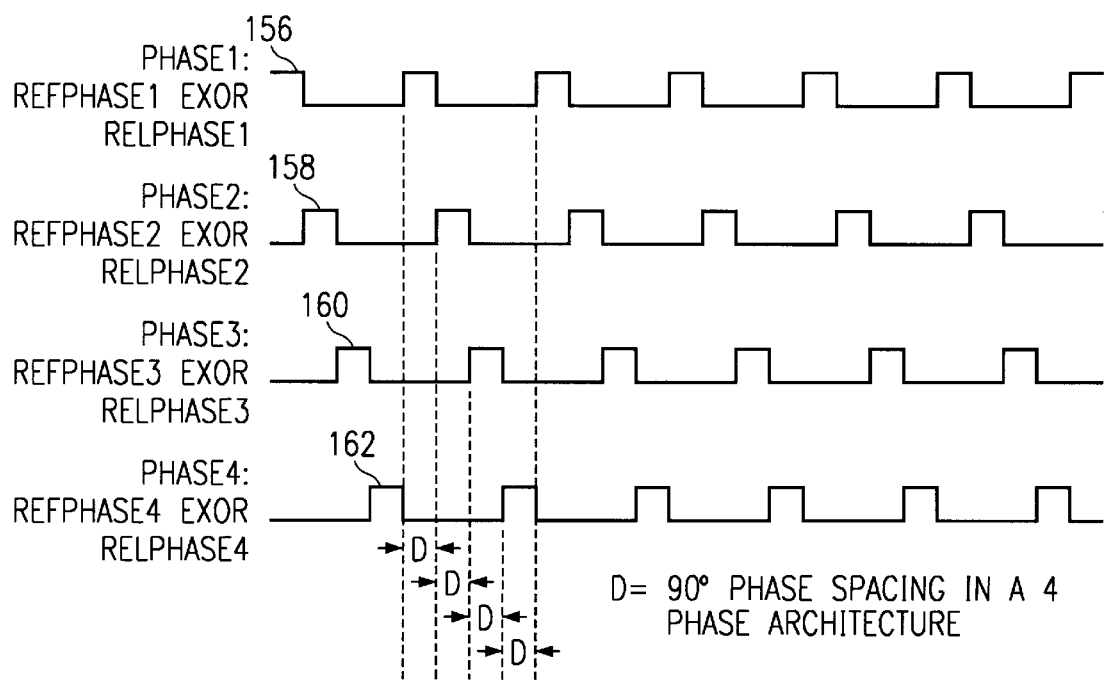
FIG. 14 is a signal diagram showing the composite clock signals that are output as the result of logic operations on the reference clock signals of FIG. 12 and relative clock signals of FIG. 13 for each phase.

FIGS. 12, 13 and 14 illustrate the waveforms for a 4 phase system with a 120° offset added between Refclock 84 and Relclock 146 and M set equal to 6. The signal graphs of FIGS. 12, 13 and 14 should be considered together for a fuller understanding of the invention. The duty cycle ratio that results for each Phase$_n$ clock 156, 158, 160 and 162 is now calculated as the phase difference between respective Refphase$_n$ 108, 110, 112 and 114, and Relphase$_n$ 148, 150, 152 and 154 clocks subtracted from 360° and then divided by 180° and multiplied by 100% to express the result as a percentage.

Figure 15:
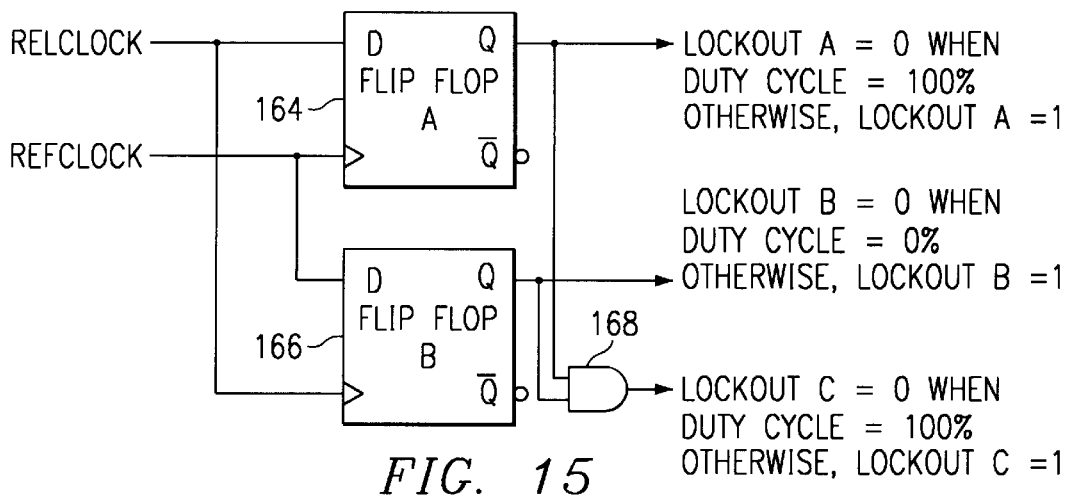
FIG. 15 is a logic circuit diagram for a circuit to monitor the reference and relative clock waveforms.

The addition of the 120° offset allows the system to monitor for 0% and 100% duty cycle limits without risk of the phase lock loop losing the frequency lock condition. From the waveforms shown in FIGS. 12, 13 and 14, Refclock and Relclock can be monitored using two flip flops 164 and 166 as shown in FIG. 15. In this figure, it is assumed that each flip flop 164 and 166 is rising edge triggered. The output of flip flop A 164 clocking a digital 0 implies the system has obtained a 100% duty cycle state, while the output of flip flop B 166 clocking a digital 0 implies the system has obtained a 0% duty cycle condition. An AND gate 168 produces a 0 when either of these conditions is achieved. Given the relationship between the Refclock and Relclock signals, flip flop A 164 and flip flop B 166 will never clock a digital 0 simultaneously. When a duty cycle limit is reached, any additional phase change beyond this condition must be ignored so that the resulting duty cycle does not change. In order to do this, the Refphase$_n$ clocks and Relphase$_n$ clocks must be assigned a static value such that the exclusive-or operation produces the correct 100% or 0% value on each Phase$_n$ clock. Therefore, when flip flop A clocks a digital 0, all Refphase$_n$ clocks are assigned a value of 1 and all Relphase$_n$ clocks are assigned a value of 0. This assignment will result in the exclusive-or operation producing a value of 1. Similarly, when flip flop B clocks a digital 0, all Refphase$_n$ clocks are assigned a value of 0 and all Relphase$_n$ clocks are assigned a value of 0. This assignment will result in the exclusive-or operation producing a value of 0.

Figure 16:
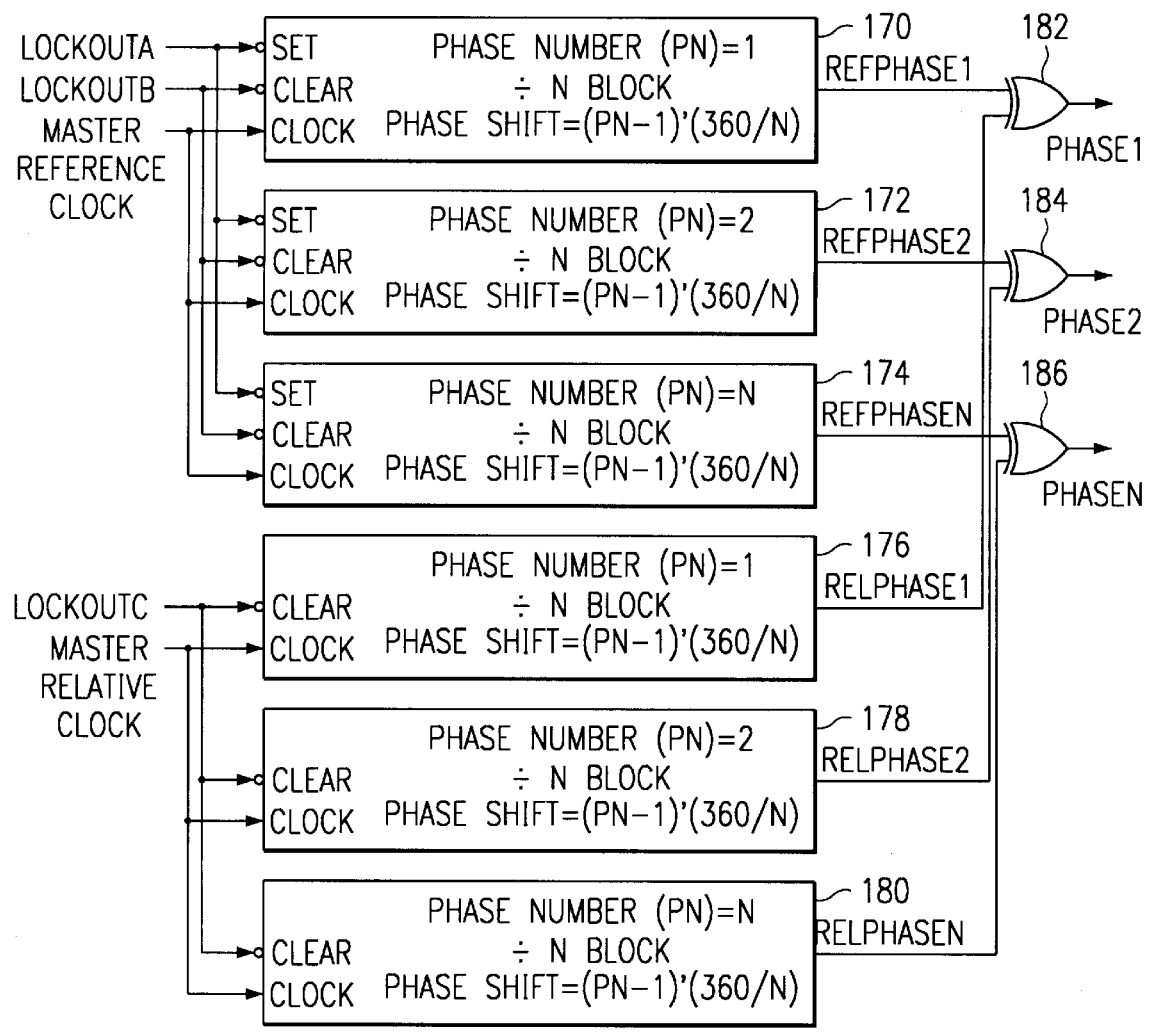
FIG. 16 is an embodiment showing an N-phase or N-stage controller portion.

FIG. 16 represents the embodiment of these functions in logic circuit blocks 170, 172, 174, 176, 178 and 180. The resulting Phase$_n$ clocks have inherently matched frequencies, matched duty cycles and equal phase spacing due to the digital method with which they were synthesized. The synthesis of each Phase$_n$ clock using an exclusive-or operation (using X-OR gates 182, 184 and 186) ensures that each phase will respond quickly to changes in phase between the master reference clock and the master relative clock. The use of a master reference clock, a master relative clock, a modified phase lock loop block to form a single analog to digital conversion block and multiple digital synthesis blocks outlined above creates a pulse width modulating architecture comprised of N variable duty cycle, phase shifted clocks. The invention shifts the critical aspects of its implementation from the analog domain to the digital domain. The digital domain methods described above can be used to synthesize any number of phased, variable duty cycle clocks, matched in frequency and duty cycle, required by a multiple phase, DC to DC converter topology.

Figure 17:
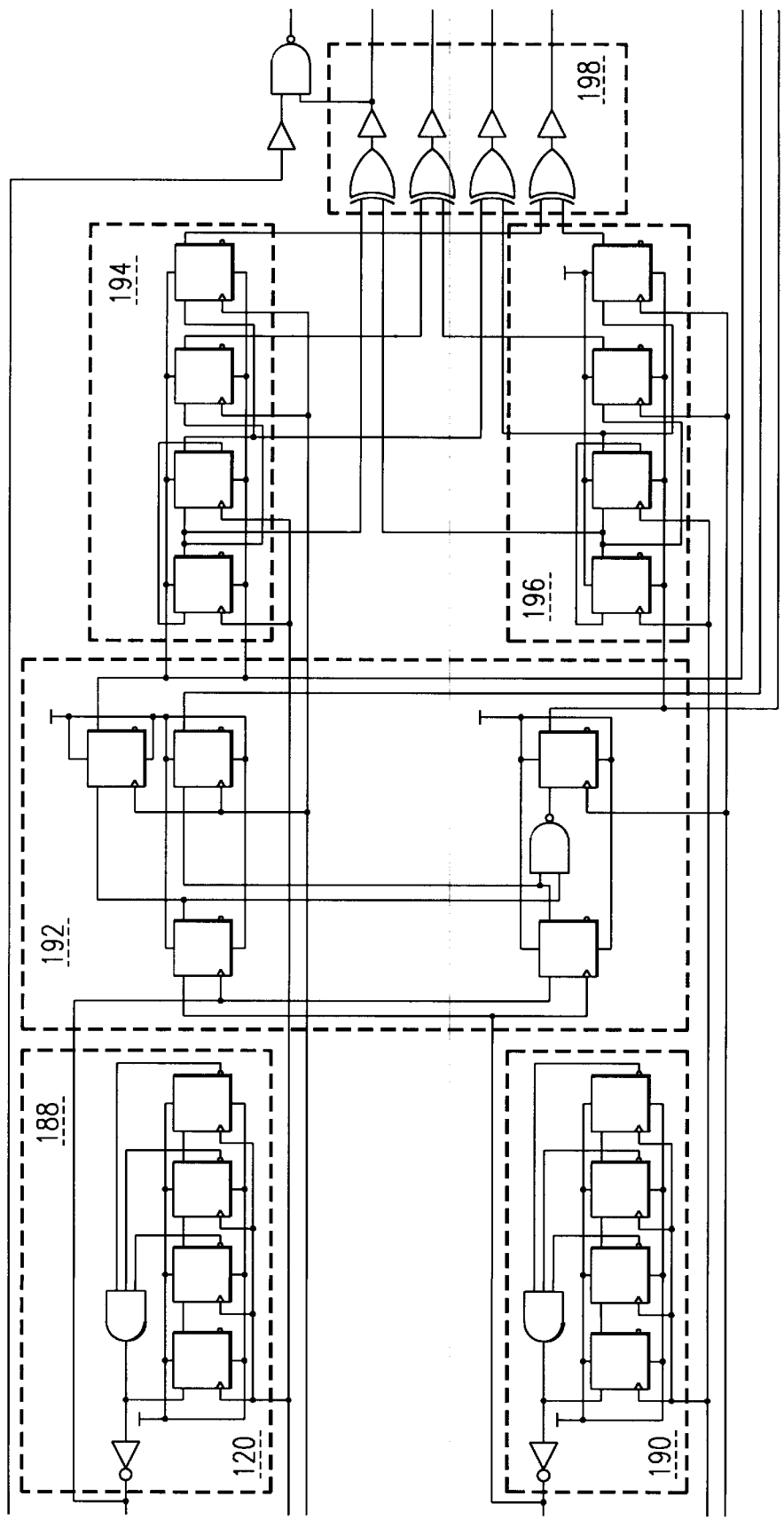
FIG. 17 is a circuit diagram showing an actual construction of the digital logic portion of the present power conversion controller architecture as a four phase implementation.

FIG. 17 shows an actual digital logic circuit using the principles of the present invention in a four phase implementation. In particular, the previously discussed functional blocks performing divide by M functions (blocks 188 and 190), logic control functions (block 192) which are shown in FIG. 15, reference clock phase shift (block 194) and relative clock phase shift (block 196), as well as exclusive-or generation of the phase control signals (block 198) are shown.

Thus, there is shown and described a simple digital design methodology to implement pulse width modulation architectures requiring multiple phase, parallel connected, power conversion stages to equally share the transfer of power from an input source to an output load. A single analog to digital conversion and digital circuitry replace multiple analog to digital conversions in current state of the art pulse width modulators as the means of converting a single analog error signal to multiple, phase shifted, variable duty cycle clocks. The proposed digital implementation and architecture is capable of meeting the critical architectural requirement of matched duty cycles and switching frequencies across all phases with reduced complexity while retaining the excellent transient performance afforded by the current state of the art.

Although other modifications and changes may be suggested by those skilled in the art, it is the intention of the inventors to embody within the patent warranted hereon all changes and modifications as reasonably and properly come within the scope of their contribution to the art.

We claim:

1. A DC to DC power converter, comprising:

an input for a source voltage;

an output for a load voltage;

at least one power conversion stage connected between said input and said output, said at least one power conversion stage having a control input for receiving a variable pulse width clock signal, said at least one power conversion stage producing a predetermined voltage at said output under control of said variable pulse width clock signal; and a controller having a feedback input connected to said output and a control output connected to said control input of said at least one power conversion stage, said controller having a digital circuit inducing a continuously variable phase shift between a reference clock signal and a relative clock signal dependent on an error signal generated from a difference between a signal at said feedback input and a reference signal.

2. A DC to DC power converter as claimed in claim 1, wherein said controller includes a phase lock loop circuit connected to receive said reference clock signal and operable to generate said relative clock signal using said error signal to induce said phase shift.

3. A DC to DC power converter as claimed in claim 1, wherein said at least one power conversion stage is a first power conversion stage, and further comprising: at least a second power conversion stage, said control output of said controller being a first control output and further comprising a second control output connected to said second power conversion stage.

4. A DC to DC power converter, comprising:

an input for a source voltage;

an output for a load voltage;

at least one power conversion stage connected between said input and said output, said at least one power conversion stage having a control input for receiving a variable pulse width clock signal, said at least one power conversion stage producing a predetermined voltage at said output under control of said variable pulse width clock signal, said at least one power conversion stage including a plurality of power conversion stages; and a controller having a feedback input connected to said output and a control output connected to said control input of said at least one power conversion stage, said controller having a digital circuit inducing a phase shift between a reference clock signal and a relative clock signal dependent on an error signal generated from a difference between a signal at said feedback input and a reference signal, said controller including:

an analog error signal portion connected to said output and to a predetermined reference voltage, said analog error signal portion generating an analog error signal corresponding to a difference between said load voltage and said predetermined reference voltage;

a digital phase lock loop portion having a reference input and a relative input and an output, said digital phase lock loop portion connected to receive said analog error signal establish a phase shift between said reference input and said relative input; and a digital logic portion connected to receive a master reference clock signal, said digital logic portion including:

a first divide by M circuit connected to receive said master reference clock signal, said first divide by M circuit generating a reference clock signal from said master reference clock signal, said reference clock signal being connected to said reference input of said digital phase lock loop portion, a second divide by M circuit connected to receive a master relative clock signal from said output of said digital phase lock loop portion, said second divide by M generating a relative clock signal that is fed to said relative input of said digital phase lock loop portion, logic circuits connected to receive said reference clock signal and said relative clock signal and conducting logic operations to generate control signals; and control outputs for the control signals corresponding in number to said plurality of power conversion stages.

5. A DC to DC power converter as claimed in claim 4, wherein M of said first and second divide by M circuits is equivalent to number to said plurality of power conversion stages plus two.

6. A method for DC to DC power conversion, comprising the steps of:

performing a single analog to digital conversion of an error signal to produce a digital signal;

synthesizing a plurality of variable duty cycle clock signals from said digital signal; and controlling a plurality of power conversion stages connected in parallel between a source and a load by said plurality of variable duty cycle clock signals, each of said plurality of variable duty cycle clock signals being connected to a corresponding one of said plurality of power conversion stages.

7. A method as claimed in claim 6, further comprising the step of:

phase shifting said plurality of variable duty cycle clock signals with respect to each other.

8. A method for DC to DC power conversion, comprising the steps of:

performing a single analog to digital conversion of an error signal to produce two phase-shifted frequency-matched clock signals, wherein a phase shift is directly proportional to the error signal;

synthesizing a plurality of variable duty cycle clock signals from said two phase-shifted frequency-matched clock signals; and controlling a plurality of power conversion stages connected in parallel between a source and a load by said plurality of variable duty cycle clock signals, each of said plurality of variable duty cycle clock signals being connected to a corresponding one of said plurality of power conversion stages.

9. A method as claimed in claim 8, wherein said synthesizing step uses digital synthesis to convert said two phase-shifted frequency-matched clock signals to one or more variable duty cycle clock signals.

10. A method as claimed in claim 8, wherein said synthesizing step uses digital synthesis to phase shift multiple variable duty cycle clocks signals.

11. A method as claimed in claim 8, wherein said step of performing a single analog to digital conversion uses a modified phase lock loop for converting an error signal to two frequency matched clock signals of variable phase.

12. A method as claimed in claim 11, further comprising the step of:

detecting 0% and 100% limits defined for duty cycle while maintaining the modified phase lock loop in a lock condition.

13. A DC to DC power converter, comprising:

an input for a source voltage;

an output for a load voltage;

a plurality of power conversion stages connected in parallel between said input and said output, said plurality of power conversion stages each having a control input for receiving a variable pulse width clock signal, said plurality of power conversion stages producing a predetermined voltage at said output under control of said variable pulse width clock signal; and a controller having:

an analog error signal portion connected to said output and to a predetermined reference voltage, said analog error signal portion generating an analog error signal corresponding to a difference between said load voltage and said predetermined reference voltage;

a digital phase lock loop portion having a reference input and a relative input and an output, said digital phase lock loop portion connected to receive said analog error signal and establish a phase shift between a reference signal at said reference input and a relative signal at said relative input dependent on said analog error signal; and a digital logic portion connected to receive a master reference clock signal, said digital logic portion including:

a first divide by M circuit connected to receive said master reference clock signal, said first divide by M circuit generating a reference clock signal from said master reference clock signal, said reference clock signal being connected to said reference input of said digital phase lock loop portion, a second divide by M circuit connected to receive a master relative clock signal as an output signal from said output of said digital phase lock loop portion, said second divide by M generating a relative clock signal that is fed to said relative input of said digital phase lock loop portion, digital logic circuits receiving said reference and relative clock signals and generating control signals; and control outputs for said control signals corresponding in number to said plurality of power conversion stages.

* * * * *